US009825753B2

(12) United States Patent
Jana et al.

(10) Patent No.: US 9,825,753 B2
(45) Date of Patent: *Nov. 21, 2017

(54) SYSTEM AND METHOD FOR FULL DUPLEX CANCELLATION

(71) Applicant: AT&T Intellectual Property I, L.P., Atlanta, GA (US)

(72) Inventors: Rittwik Jana, Parsippany, NJ (US); Vaneet Aggarwal, Parsippany, NJ (US); Christopher W. Rice, Parsippany, NJ (US); Nemmara K. Shankaranarayanan, Bridgewater, NJ (US); Melissa Duarte, Houston, TX (US); Ashutosh Sabharwal, Houston, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 82 days.

This patent is subject to a terminal disclaimer.

(21) Appl. No.: 14/881,613

(22) Filed: Oct. 13, 2015

(65) Prior Publication Data

US 2016/0036582 A1 Feb. 4, 2016

Related U.S. Application Data

(63) Continuation of application No. 14/492,588, filed on Sep. 22, 2014, now Pat. No. 9,166,766, which is a (Continued)

(51) Int. Cl.
*H04L 5/14* (2006.01)
*H04L 27/26* (2006.01)
*H04B 15/00* (2006.01)

(52) U.S. Cl.
CPC .......... *H04L 5/1461* (2013.01); *H04B 15/00* (2013.01); *H04L 5/14* (2013.01); *H04L 5/143* (2013.01); *H04L 27/265* (2013.01)

(58) Field of Classification Search
CPC .. H04L 5/14; H04W 28/048; H04W 52/0238; H04W 52/243
See application file for complete search history.

(56) References Cited

U.S. PATENT DOCUMENTS 7,466,676 B2 12/2008 Gupta et al.
7,673,075 B1 3/2010 Masiewicz
(Continued)

OTHER PUBLICATIONS

S. Sen, R. R. Choudhury, and S. Nelakuditi, CSMA/CN: Carrier Sence Multiple Access with Collision Notification. *In Proceedings of ACM Mobicom*, Illinois, USA, Aug. 2010.
(Continued)

*Primary Examiner* — Benjamin H Elliott, IV

(57) ABSTRACT

Disclosed herein are systems, methods, and computer-readable storage media for enabling improved cancellation of self-interference in full-duplex communications, or the transmitting and receiving of communications in a single frequency band without requiring time, frequency, or code divisions. The system estimates the signal strength and phase of a self-interference signal, generates a cancellation signal based on this estimate, then uses the cancellation signal to suppress the self-interference before sampling received analog signal. After applying the cancellation signal, the system samples and digitizes the remaining analog signal. The digitized signal is then subjected to additional digital cancellation, allowing for extraction of the desired signal.

20 Claims, 7 Drawing Sheets

Related U.S. Application Data continuation of application No. 13/549,189, filed on Jul. 13, 2012, now Pat. No. 8,842,584.

(56) References Cited

U.S. PATENT DOCUMENTS

| | | | |
|---|---|---|---|
| 8,462,671 B2 | 6/2013 | Rinne et al. | |
| 8,472,467 B2 | 6/2013 | Oyman et al. | |
| 8,804,583 B2* | 8/2014 | Aggarwal | H04L 5/143 370/279 |
| 8,842,584 B2* | 9/2014 | Jana | H04L 5/143 370/278 |
| 9,094,196 B2 | 7/2015 | Aggarwal | |
| 9,166,766 B2* | 10/2015 | Jana | H04L 5/143 |
| 9,167,601 B2* | 10/2015 | Aggarwal | H04L 5/143 |
| 2001/0050913 A1 | 12/2001 | Chen | |
| 2002/0071448 A1 | 6/2002 | Cervello et al. | |
| 2006/0149963 A1 | 7/2006 | Lu et al. | |
| 2007/0060158 A1 | 3/2007 | Medepalli | |
| 2007/0110029 A1 | 5/2007 | Gilmore | |
| 2007/0153760 A1 | 7/2007 | Shapira | |
| 2007/0177435 A1 | 8/2007 | Beach | |
| 2008/0008126 A1 | 1/2008 | Shirakabe et al. | |
| 2008/0080553 A1 | 4/2008 | Hasty | |
| 2008/0112517 A1 | 5/2008 | Parts et al. | |
| 2010/0232324 A1 | 9/2010 | Radunovic et al. | |
| 2010/0329131 A1 | 12/2010 | Oyman | |
| 2011/0051796 A1 | 3/2011 | Khayrallah | |
| 2011/0116401 A1 | 5/2011 | Banerjea | |
| 2011/0182216 A1 | 7/2011 | Ono et al. | |
| 2011/0244790 A1 | 10/2011 | Kwak et al. | |
| 2011/0317633 A1 | 12/2011 | Tan et al. | |
| 2012/0008599 A1 | 1/2012 | Marin | |
| 2012/0106371 A1 | 5/2012 | Abraham | |
| 2012/0147790 A1 | 6/2012 | Khojastepour et al. | |
| 2012/0155336 A1 | 6/2012 | Khojastepour et al. | |
| 2012/0177017 A1 | 7/2012 | Gong | |
| 2012/0182867 A1 | 7/2012 | Farrag | |
| 2012/0201153 A1 | 8/2012 | Bharadia et al. | |
| 2012/0320887 A1 | 12/2012 | Chintalapudi | |
| 2013/0051335 A1 | 2/2013 | Adachi | |
| 2013/0155912 A1 | 6/2013 | Khojastepour | |
| 2013/0188760 A1 | 7/2013 | Subramanian et al. | |
| 2013/0201857 A1 | 8/2013 | Bhargava et al. | |
| 2013/0215805 A1 | 8/2013 | Hong et al. | |
| 2013/0223294 A1 | 8/2013 | Karjalainen et al. | |
| 2013/0244720 A1 | 9/2013 | Hsia et al. | |
| 2013/0250866 A1 | 9/2013 | Hui et al. | |
| 2013/0301487 A1 | 11/2013 | Khandani | |
| 2014/0010145 A1 | 1/2014 | Liu et al. | |
| 2014/0016515 A1 | 1/2014 | Jana et al. | |
| 2014/0016516 A1 | 1/2014 | Aggarwal et al. | |
| 2014/0044038 A1 | 2/2014 | Zhang | |
| 2014/0078940 A1 | 3/2014 | Aggarwal et al. | |
| 2016/0036582 A1* | 2/2016 | Jana | H04L 5/143 370/278 |
| 2016/0044712 A1 | 2/2016 | Aggarwal | |

OTHER PUBLICATIONS

A. Sahai and G. Patel and A. Sabharwal. Pushing the limits of Full-duplex: Design and Real-time implementation. In arXiv.org: 1107.0607, 2011.

S. Sen, R. R. Choudhury, and S. Nelakuditi. No time to Countdown: Migrating Backoff to the Frequency Domain. *In Proceedings of ACM Mobicom*, Nevada, USA, Sep. 2011.

N. Singh and D. Gunawardena and A. Proutiere and B. Radunovia and H. V. Balan and P. Key. Efficient and Fair MAC for wireless networks with self-interference cancellation. In *Proceedings of WiOpt*, Princeton, NJ, 2011.

J. Choi and M. Jain and K. Srinivasan and P. Levis and S. Katti. Achieving Single Channel, Full Duplex Wireless Communication. In *Proceedings of the ACM Mobicom*, Illinois, USA, 2010. ACM New York, NY, USA.

M. Duarte, A. Sabharwal. Full-Duplex Wireless Communications Using Off-The-Shelf Radios: Feasibility and First Results. Forty-Fourth Asilomar Conference on Signals, Systems, and Computers, 2010.

M. Jain, J. Choi, T. Kim, D. Bharadia, K. Srinivasan, S. Seth, P. Levis, S. Katti and P. Sinha. Practical, Real-time, Full Duplex Wireless, In *Proceedings of the 17th Annual International Conference on Mobile Computing and Networking (Mobicom* 2011).

E. Everett, "Empowering full-duplex wireless communication by exploiting directional diversity," Systems and Computers (ASILOMAR), 2011 Conference Record of the Forty Fifth Asilomar Conference on Signals; Conference date: Nov. 6-9, 2011; ISBN: 978-1-4673-0321-7.

* cited by examiner

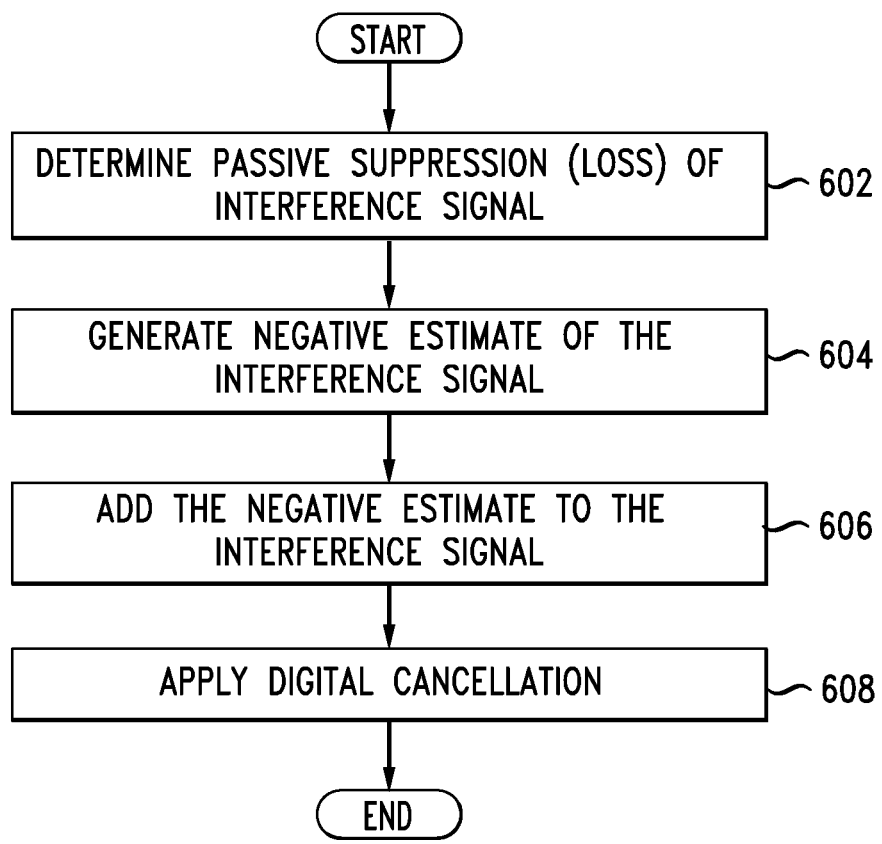

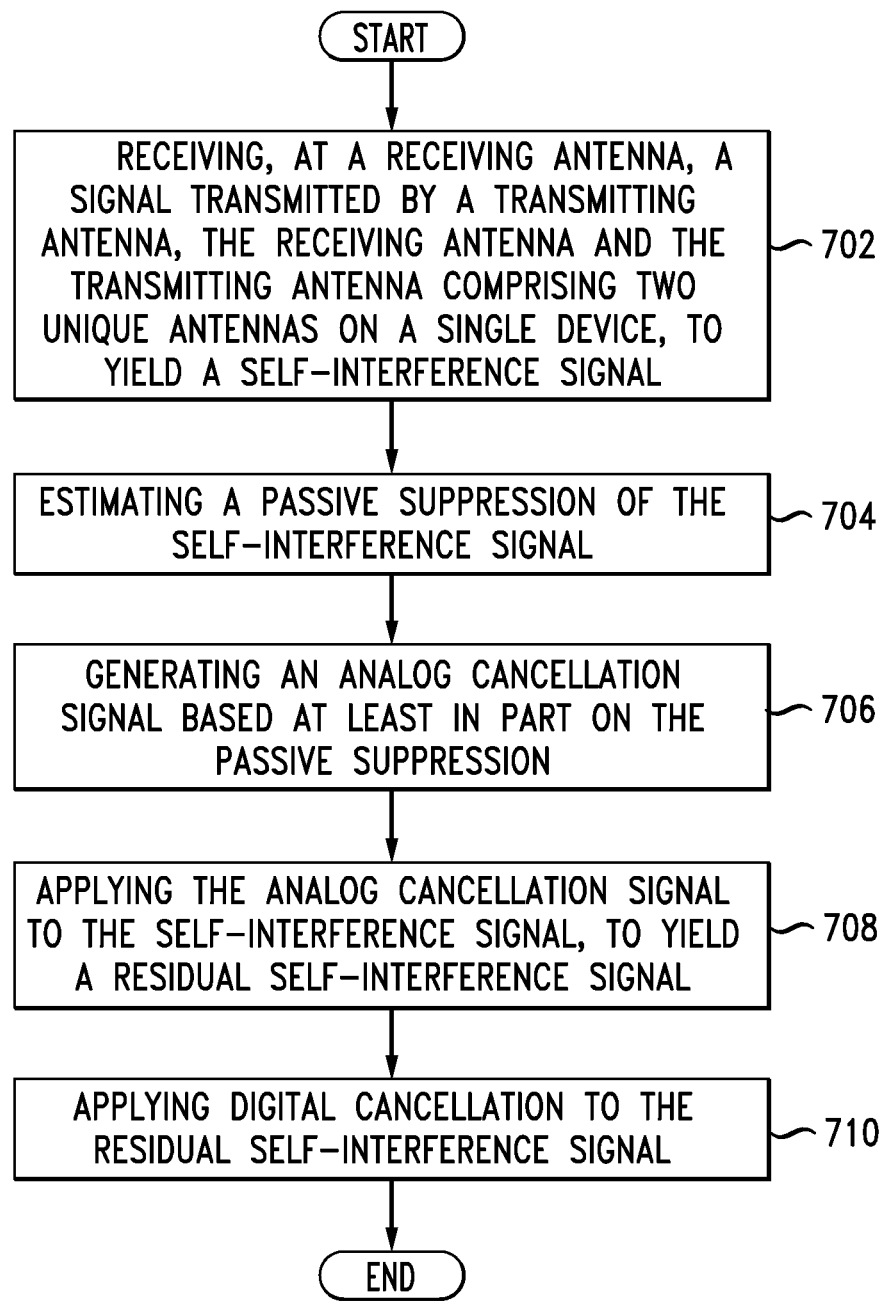

SYSTEM AND METHOD FOR FULL DUPLEX CANCELLATION

PRIORITY INFORMATION

The present application is a continuation of U.S. patent application Ser. No. 14/492,588, filed Sep. 22, 2014, which is a continuation of U.S. patent application Ser. No. 13/549,189, filed Jul. 13, 2012, now U.S. Pat. No. 8,842,584, issued Sep. 23, 2014, the contents of which are incorporated herein by reference in their entirety.

BACKGROUND

1. Technical Field

The present disclosure relates to full duplex communications and more specifically to cancelling transmission interference in full duplex communications.

2. Introduction

Currently deployed wireless communications systems cannot transmit and receive on the same frequency at the same time, i.e., networks do not operate in a full-duplex fashion. As a result, networks are either time-division duplex (e.g., WiFi) or frequency-division duplex (e.g., cellular). The challenge in achieving true full-duplex communication is a large power differential between the "self-interference" created by a node's own radio transmission and the signal of interest. This large power differential exists because the self-interference signal has to travel much shorter distances compared to the signal of interest. The large power differential swamps the signal of interest due to finite resolution of analog-to-digital conversion.

Previous efforts to suppress self-interference have reported success for only very short range line-of-sight (LOS) channels, none more than 8 meters, like those encountered in personal area networks such as Bluetooth and Zigbee. Such small range abilities continue to remain the bottleneck for including full-duplex in practical wireless networks. By overcoming the limitations associated with previous solution, full-duplex communications can extend communication range while increasing bandwidth.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 6 illustrates a first method embodiment; and

FIG. 7 illustrates a second method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for full duplex cancellation of self-interference. A system, method and non-transitory computer-readable media are disclosed which suppress self-interference in full duplex communications Disclosed are systems, methods, and non-transitory computer-readable storage media for enabling improved cancellation of self-interference in full-duplex communications. In particular, a system configured according to this disclosure can transmit and receive communications in a single frequency band without requiring time, frequency, or code divisions. In another aspect, the principles disclosed herein can be utilized in connection with one or more of time division, frequency division and/or code division. A system estimates the signal strength and phase of a self-interference signal, generates a cancellation signal based on the estimate, and uses the cancellation signal to suppress the self-interference before sampling a received analog signal. This suppression matches the cancellation signal to the self-interference signal by both phase and frequency. After applying the cancellation signal, the system samples and digitizes the remaining analog signal. The digitized signal is then subjected to additional digital cancellation, allowing for extraction of the desired signal. Further embodiments of this general concept and related details shall be provided herein.

Figure 1:
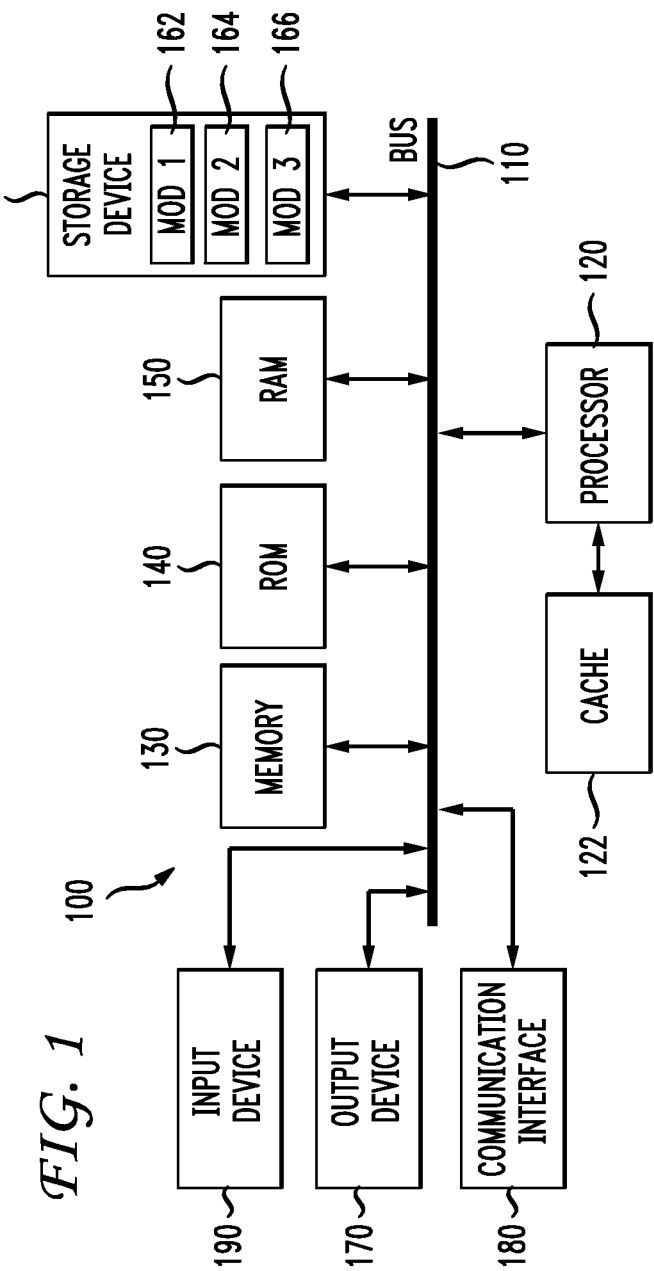
FIG. 1 illustrates an example system embodiment.

A brief introductory description of a basic general purpose system or computing device in FIG. 1 which can be employed to practice the concepts is disclosed herein. A more detailed description of cancelling self-interference in full duplex communications then follows. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2A:
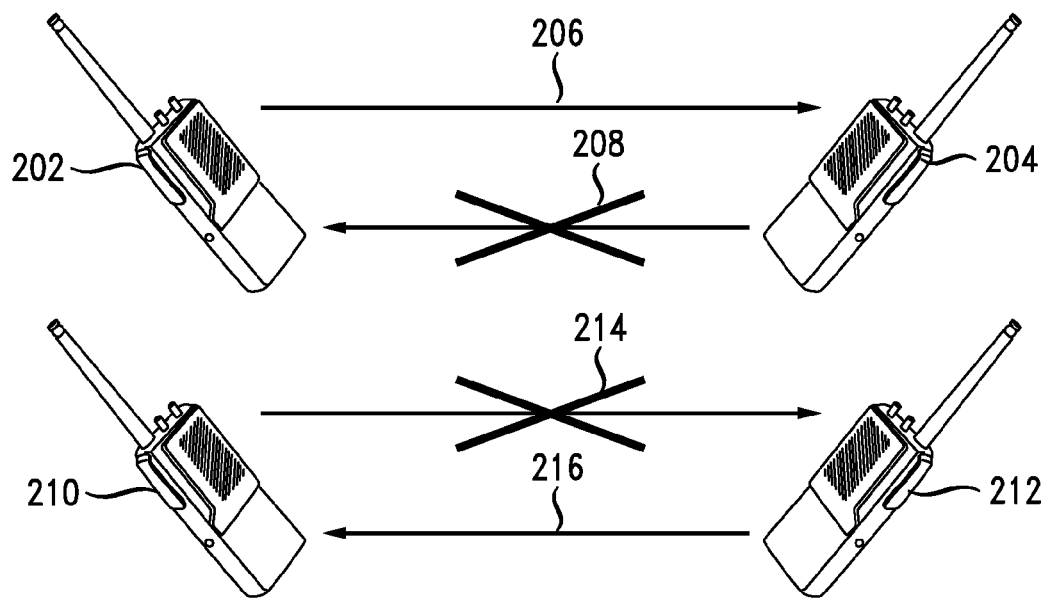
FIG. 2*a* illustrates an example of half-duplex communications.

Having disclosed some components of a computing system, the disclosure now turns to FIG. 2A, which illustrates half-duplex communications. A duplex communication system is a system capable of communicating in both directions. A half-duplex communication system is capable of communicating in a single frequency spectrum in both directions, but in only one direction at a time, not simultaneously. As illustrated, a radio 202 can send communications 206 to a second radio 204, but cannot simultaneously receive communications 208 on the same frequency from the second radio 204. Likewise, a radio 210 can receive communications 216 from a second radio 212, but cannot simultaneously send communications 214 in the same frequency. A classic example of half-duplex communication is a pair of walki-talkies, where when a user presses the Push-To-Talk button, the user loses the ability to receive communications.

Figure 2B:
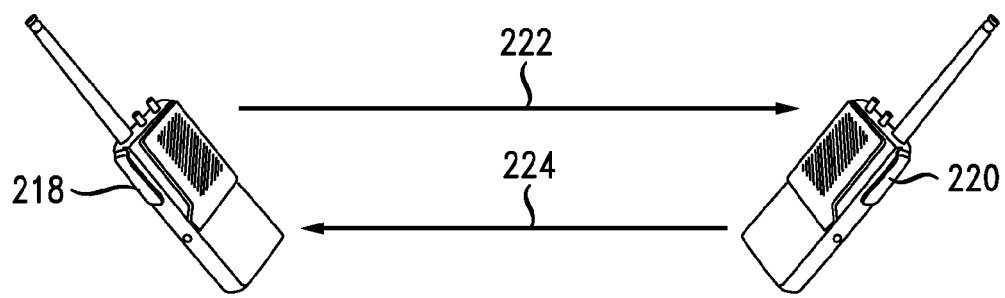
FIG. 2*b* illustrates an example of full-duplex communications

FIG. 2B illustrates full-duplex communications between two radios 218, 220. In a full duplex system, a radio 218 can both send communications to 222 and receive communications 224 from a second radio 220 at the same time, in the same frequency spectrum. Full-duplex systems traditionally do not work because of the self-interference a single radio receives while transmitting.

Figure 3:
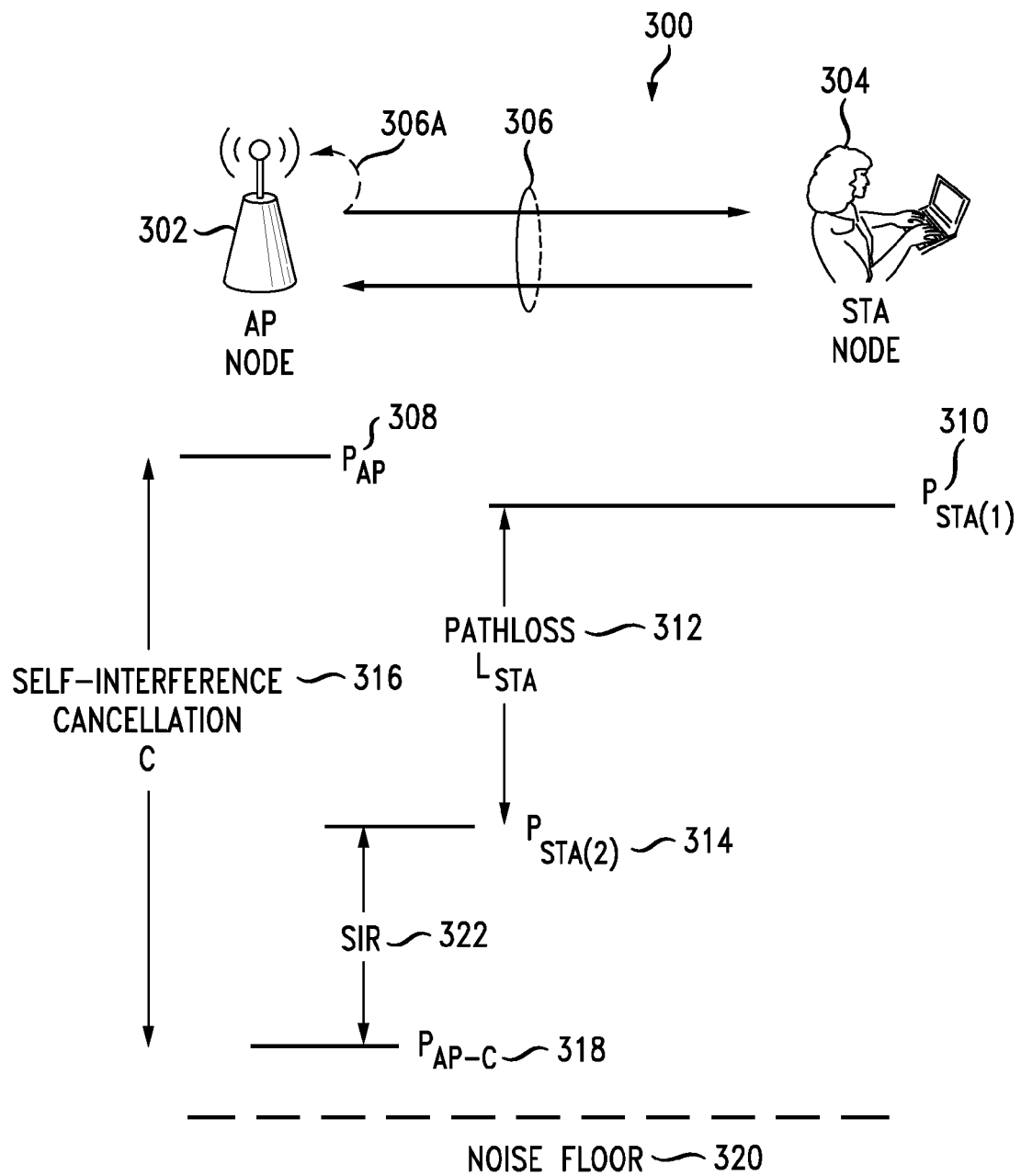
FIG. 3 illustrates an example of full-duplex communication power levels.

In order for full-duplex systems to work correctly, the Signal-to-Interference Ratio (SIR) between the desired signal and the self-interference should meet a threshold determined by digital cancellation methods. FIG. 3 illustrates an example of full-duplex communication power levels 300 in a system configured according to this disclosure. As illustrated, an Access Point (AP) node 302 is sending and receiving communications 306 with a station (STA) node 304, such as a laptop, smartphone, or other WiFi device. The lower portion of FIG. 3 illustrates relative power levels for the signals including a noise floor 320. The power level for the signal being transmitted from the AP node 302 is noted as $P_{AP}$ 308, while the power level being transmitted from the STA node 304 is noted as $P_{STA(1)}$ 310. The power levels seen by a receiving antenna at the AP node 302 are $P_{AP}$ 308 and $P_{STA(2)}$ 314. The power drop experienced between the initial transmission $P_{STA(1)}$ 310 of a signal from the STA node 310 and the reception of that signal $P_{STA(2)}$ 314 at the AP node 302 results from natural power attenuation, or pathloss $L_{STA}$ 312, as the signal propagates through air or other mediums. The SIR 322 in this example is sufficient for the AP Node 302 to determine the desired signal. In this case, $P_{STA(2)}$, also identified as $P_{STA(1)}$-$L_{STA}$, represents the power level of the desired signal that must be decoded successfully by the AP node 302.

One issue that can affect the successful decoding of a signal in full-duplex communication is the fact that the signal 306 transmitted from the AP node 302 is also received (denoted by the hashed signal 306A transmitted from AP Node 302 but also returning to the node) by the AP node 302 receiving antenna as self-interference. For illustration purposes, the power level of the transmitted signal $P_{AP}$ 308 is assumed to be the received power level of the self-interference signal.

In order for the AP node 302 to properly decode the desired signal from the STA node 304, the Signal-to-Interference Ratio (SIR) 322 should be above a threshold value. The value of SIR 322 threshold required for decoding can vary depending on digital cancellation techniques employed. However, the noise floor 320 and interfering signals can reduce the SIR 322.

In the illustrated example, because $P_{AP}$ 308 is above $P_{STA(2)}$ 314, the SIR 322 would be negative and the AP node 302 would be unable to decode the desired signal $P_{STA(2)}$ 314. In order for the self-interference to be reduced below the desired signal, the system generates self-interference cancellation signal C 316. This self-interference cancellation signal C 316 is based on both the strength and phase of the self-interference signal for detected frequencies. Upon the cancellation signal C 316 being applied to the self-interference signal having a power level of $P_{AP}$ 308 using an RF Adder, the resulting power level is $P_{AP\text{-}C}$ 318. This results in a positive SIR 322, and the system can now use digital cancellation techniques to decode the desired signal having a power level of $P_{STA(2)}$ 314.

Figure 4:
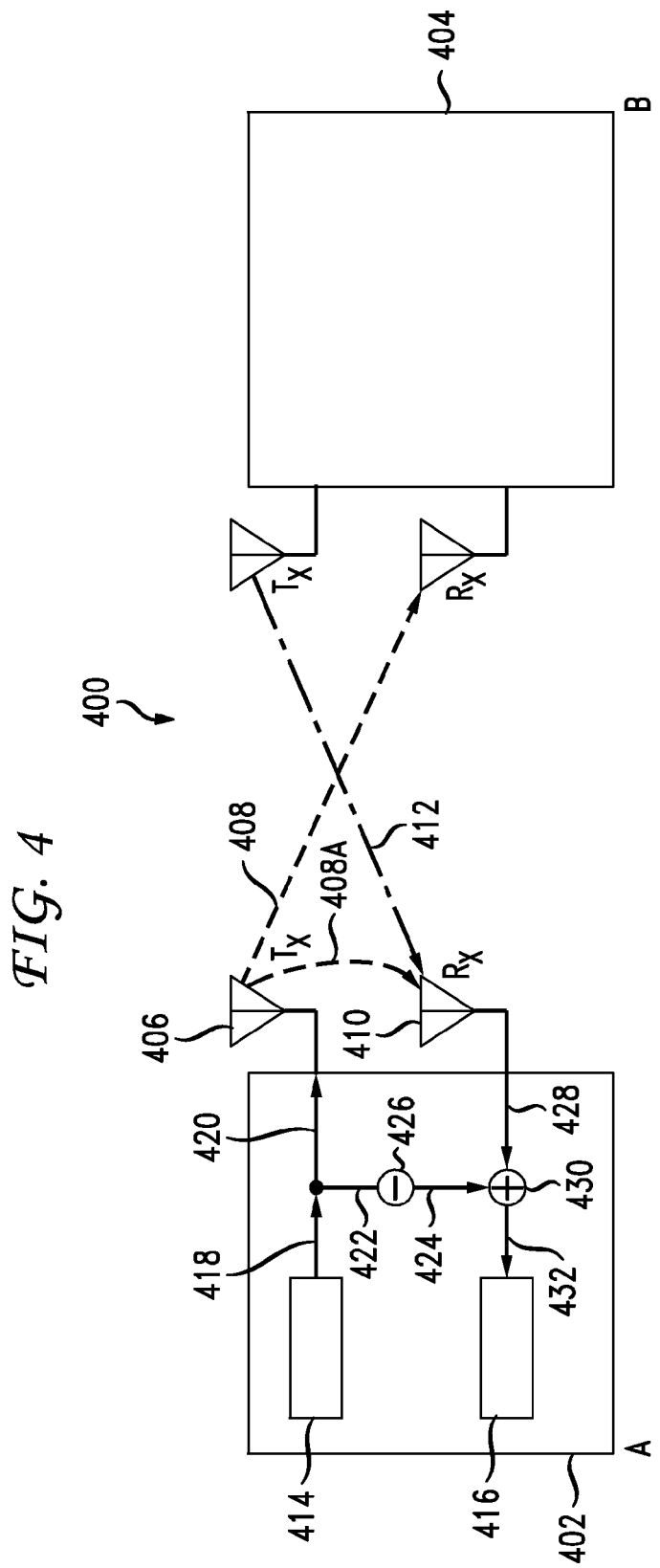
FIG. 4 illustrates a high-level example of a full-duplex embodiment.

FIG. 4 illustrates a high-level example of a full-duplex embodiment 400 according to this disclosure. As illustrated, both node A 402 and node B 404 are capable of full-duplex communications. In other configurations, only one node in a pair of nodes may be full-duplex capable, whereas in yet other configurations there are many nodes which are full-duplex capable. Node A 402 has a transmitting antenna 406 and a receiving antenna 410. Data is prepared for transmission at Node A 402 or prior to arriving at Node A 402 This preparation is illustrated as taking place in box 414, and can include multiplexing, upconversion, encryption, modulation, compression, and/or any other data preparation whether necessary or not to transmit a signal. The prepared signal 418 is then split or copied into two separate paths. A first path 420 directs the signal 418 to the transmitting antenna 406. The second path 422 routes the signal 418 to a module 426 which produces a cancellation version 424 of the prepared signal 418, which will be used to cancel out any self-interference signal received. In one configuration, the cancellation signal 424 has the opposite voltage of the prepared signal 418, while maintaining an identical phase. In another configuration, the cancellation signal 424 is 180° out of phase with the prepared signal, with a power level selected. Other configurations for combining a cancelling signal with an interference signal, leaving a desired signal, are also within the scope of this disclosure.

As Node A 402 transmits the prepared signal 418 to Node B 404 from the transmitting antenna 406 as the transmitted signal 408, the receiving antenna 410 also receives the transmitted signal 408A as a self-interference signal. The receiving antenna 410, in addition to receiving the self-interference signal 408A, also receives a communication 412 originating from Node B 404. Node A 402 therefore receives the self-interference signal 408A from itself and a desired signal 412 from Node B 404. Because Node A is operating in full-duplex, these signals are combined into a single overlapping signal 428. This received combination signal 428 is then added to the previously produced cancellation signal 424 that has an opposite phase or voltage of the combination signal 428. By adding, or otherwise combining 430, the cancellation signal 424 with the received signals 428, the self-interference signal 408 is mostly (though not completely) removed, producing a clean signal 432. The system processes the clean signal 432 including digital processing within a data processing module 416 of Node A 402. Other processing besides digital processing is contemplated as part of this disclosure.

As illustrated in FIG. 4, certain configurations will prepare the data 414 for RF transmission, then split the RF signal 418 along separate paths 420, 422 for transmission and cancellation. However, other configurations can split the cancellation and transmission signals at different points in the data processing. For example, in certain configurations, the system produces the cancellation signal 422 after signal upconversion, with the signal in a broadband format. In other configurations, the system produces the cancellation signal 422 prior to upconversion, prior to multiplexing, or prior to performing a Fourier transform on the signal. Regardless of where the cancellation signal and transmission signal split, the system requires feedback regarding the received self-interference and associated passive attenuation to create an accurate cancellation signal.

Figure 5:
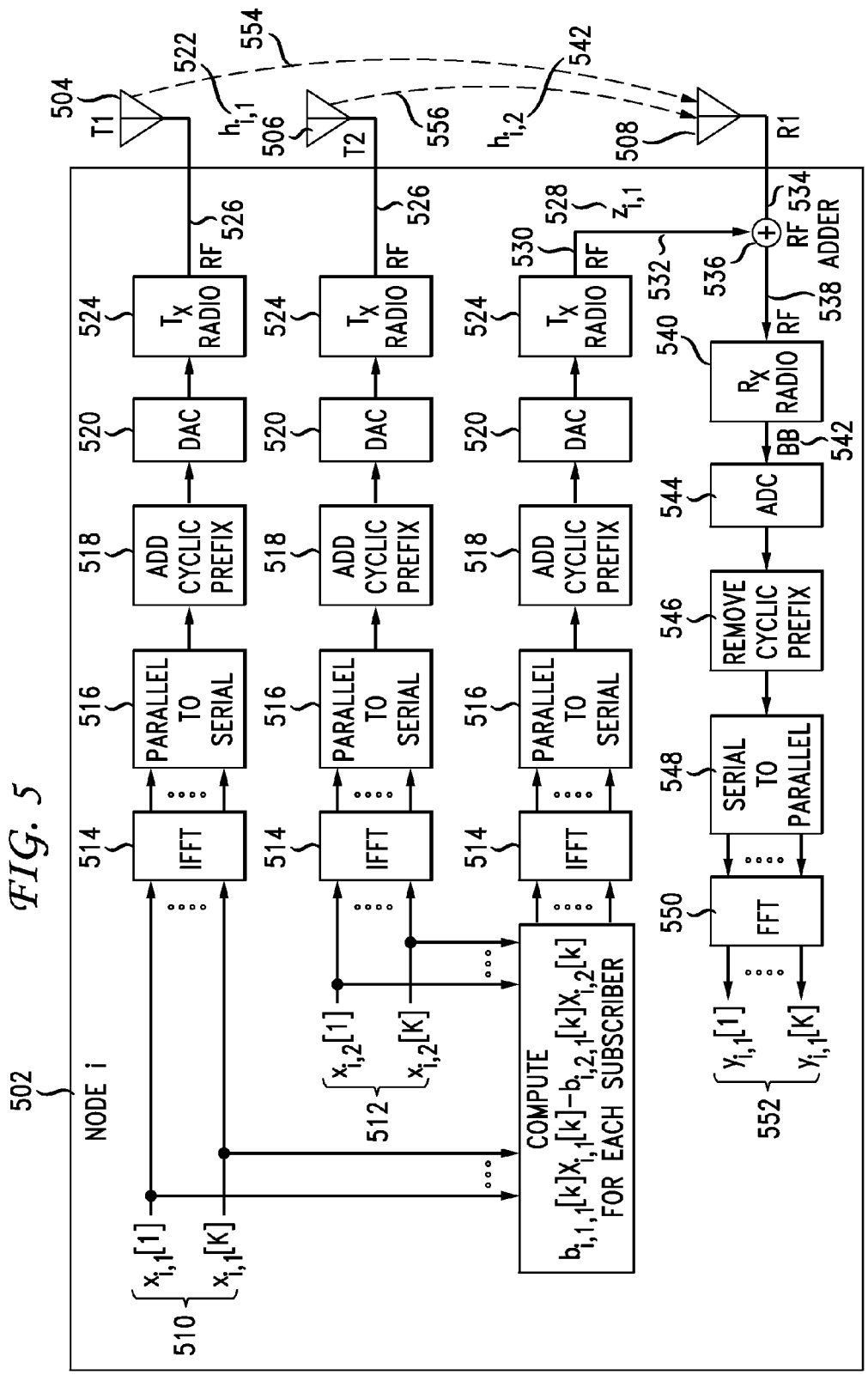
FIG. 5 illustrates an example a full-duplex device embodiment.

With this high level understanding of the cancellation process, and we now discuss the specific cancellation techniques utilized within this disclosure using FIG. 5, which illustrates an example of a full-duplex device embodiment 502. This example full-duplex device embodiment 502, utilizes a combination of passive suppression, active analog cancellation, and digital cancellation. Other configuration or embodiments could have fewer or additional components while continuing to apply the disclosed full-duplex method.

As illustrated, the device receives or generates signal inputs 510, 512. Each set of signal inputs, $\{x_{i,1}[1]-x_{i,1}[k]\}$ 510 and $\{x_{i,2}[1]-x_{i,2}[k]\}$ 512 are sent to a respective transmit antenna $T_1$ 504 or $T_2$ 506. In this configuration, each set of signal inputs represents a channel, and the brackets [1]-[k] represent subcarriers within a respective channel. In other configurations a single channel can be present, or additional channels can be present. When necessary, these signal inputs 510, 512 are subjected to IFFT (Inverse Fourier Transform) 514, then converted from parallel signals into a serial signal using a Parallel to Serial 516 component, such as a multiplexing component. A cyclic prefix 518 is then added to the bitstream received from the parallel to serial component 516 and the signal is converted from a digital bitstream into an analog signal at a Digital to Analog Converter (DAC) 520. The resulting analog signal is a signal which is upconverted into a broadband signal and amplified by a Tx Radio 524, creating an RF signal 526 which is broadcast by the respective antenna $T_1$ 504 or $T_2$ 506.

The signal being transmitted from antenna $T_1$ 504 is represented as a dashed line 554 and represents the electromagnetic transmission of signal inputs $\{x_{i,1}[1]-x_{i,1}[k]\}$ 510. The transmitted signal 554 from T1 504 undergoes a passive attenuation illustrated as $h_{i,1}$ 522. Likewise, the signal being transmitted from antenna T2 is also represented as a dashed line 556 and represents the electromagnetic transmission of signal inputs $\{x_{i,2}[1]-x_{i,2}[k]\}$ 512. In addition, the transmitted signal 554 from T2 506 undergoes a passive attenuation illustrated as $h_{i,2}$ 542. As the signals $\{x_{i,1}[1]-x_{i,1}[k]\}$ 510 and $\{x_{i,2}[1]-x_{i,2}[k]\}$ 512 are transmitted as electromagnetic signals 554, 556 to another device, they are also received at a receiving antenna $R_1$ 508 on the illustrated device 502.

The passive attenuation $h_{i,1}$ 522 and $h_{i,2}$ 542 occurs when transmitting a signal 554, 556 through any medium, and is also known as passive suppression. This passive suppression $h_{i,1}$ 522 and $h_{i,2}$ 542 varies with time and frequency. Increasing the passive suppression is desirable to help increase the Signal-to-Noise ratio previously discussed. The amount of passive suppression depends on the distance between antennas, the antenna directionality, and/or the antenna placement on the full-duplex device 502. Any combination of these parameters in addition to other parameters may be employed according to this disclosure.

The exemplary full-duplex device 502 then performs active analog cancellation in the analog domain to remove any remaining self-interference signal received after the passive suppression $h_{i,1}$ 522 and $h_{i,2}$ 542 of the transmitted signals 554, 556, prior to the received signal 534 passing through an Analog-to-Digital Converter (ADC) 544. For an OFDM MIMO (Othogonal Frequency Division Multiplexing Multi-In Multi-Out) node i, the self-interference signal $y_{i,1}$ 534 received on subcarrier k after passive suppression $h_{i,1}$ 522 and $h_{i,2}$ 542 is calculated using the equation:

$$y_{i,n}^{PS}[k]=\Sigma_{m=1}^{M}h_{i,m}[k]x_{i,m}[k]$$

where m represents each channel transmitted and n represents the receiving antenna which receives both the desired signal and the self-interference signals 554, 556. As illustrated, the device 502 has a single receiving antenna R1 508, and therefore n=1 in this example. In other configurations, with multiple receiving antennas, each receiving antenna could require a cancellation signal generated specific to the self-interference acquired at that respective receiving antenna.

The device 502 creates a cancelling signal $z_{i,1}[k]$ 528 local to the device 502. The cancelling signal $z_{i,1}[k]$ 528 is combined with the self-interference signal $y_{i,1}[k]$ 534 after passive suppression $h_{i,1}$ 522 and $h_{i,2}$542 using an RF Adder 536, with the purpose of extracting a desired signal obscured by the self-interference signal $y_{i,1}$ 534. An RF Adder can also be referred to as Power Combiner and Power Divider. The cancelling signal $z_{i,1}[k]$ 528 is calculated using the equation:

$$z_{i,n}[k]=-h_{i,m}^{W}[k]\Sigma_{m=1}^{M}b_{i,m}[k]x_{i,m}[k]$$

where $h_{i,n}^{W}[k]$ denotes the magnitude and phase of passive suppression of the cancellation signal at subcarrier k when passing through the wire connected to the RF adder 536. Further, $b_{i,m}[k]$ denotes the cancellation coefficient per subcarrier for the self-interference received at antenna $R_1$ 508 from transmitting antenna m at subcarrier k. $B_{i,m}[k]$ represents the coefficient needed to make the cancellation signal $z_{i,1}[k]$ as close as possible to the self-interference signal. The self-interference channel is usually not frequency flat. The channel attenuation can vary significantly across frequency and packet to packet. As a result, the best analog cancellation is achieved when the analog cancellation signal can be adjusted per subcarrier, as required due to the self interference channel frequency response.

The self-interference signal, after analog cancellation 538, is therefore equal to:

$$y_{i,n}^{AC}[k]=y_{i,n}^{PS}[k]-z_{i,n}[k]$$

Which can be rewritten as:

$$y_{i,n}^{AC}[k]=\Sigma_{m=1}^{M}(h_{i,m}[k]-h_{i,m}^{W}[k]b_{i,m}[k])x_{i,m}[k]$$

Because the self-interference of the received signal can only be estimated, perfect analog cancellation cannot occur. Instead the practical equation $$b_{i,m}[k]=\hat{h}_{i,m}[k]/\hat{h}_{i,m}^{W}[k]$$

is used, where $\hat{h}_{i,m}[k]$ and $\hat{h}_{i,m}^{W}[k]$ are estimates of $h_{i,m}[k]$ (passive suppression) and $h_{i,m}^{W}[k]$ (passive suppression of the cancellation signal) respectively. The estimates of $h_{i,m}[k]$ and are computed based on pilot signals sent from each transmitter radio 524 on orthogonal time slots. Because $h_{i,m}^{W}[k]$ represents the passive suppression of the cancellation signal, it is a static channel and can be estimated at a lower frequency than passive suppression $h_{i,m}[k]$ of the transmitted signals 554, 556. As current WiFi implementations send pilots at the beginning of a packet, these pilots can be used for estimation of the self-interference channel $y_{i,1}[k]$, and therefore estimation of self-interference channels does not require modification of the pilots in a packet.

The cancellation signal $z_{i,1}$ 528 utilizes similar steps as the original data sets 510, 512. After computing estimates, the computed cancellation signal undergoes IFFT 514, Parallel to Serial conversion 516, has a cyclic prefix added 518, is converted to a broadband signal using a DAC 520, and then converted to an RF signal using a Tx Radio 524. After the analog cancellation has occurred using the RF adder 536, the resulting RF signal 538 represents the desired signal with some remaining self-interference, despite having removed much self-interference via passive suppression and active analog cancellation. The resulting signal 538 then undergoes the reverse process to obtain the desired data. That is, the signal is received by an Rx Radio 540 and converted from RF to a baseband signal. The signal is then converted from analog to digital. The cyclic prefix is removed 546, the signal is converted from serial to parallel 548, and a Fast Fourier Transform (FFT) 550 is performed to yield a set of data $\{yi,1[1]-yi,1[k]\}$ 552. At any point after the conversion to digital 544 from the baseband analog, the residual self-interference can be removed using digital cancellation.

Active digital cancellation estimates $y_{i,m}^{AC}[k]$ and subtracts this estimate from the received signal in the digital domain. The estimate of $y_{i,m}^{AC}[k]$ is computed based on a second round of pilots sent from each transmitter antenna and received while applying analog cancellation to each receiver antenna. Alternatively, the estimate of $y_{i,m}^{AC}[k]$ can be computed without extra pilots if implemented based on correlation between the transmitted and received self-interference payload signal.

Having disclosed some basic system components and concepts, the disclosure now turns to the exemplary method embodiments shown in FIGS. 6-7. For the sake of clarity, the methods are discussed in terms of an exemplary system 100 as shown in FIG. 1 configured to practice the method. The system can include a processor and a computer readable medium storing instructions which, when executed by the processor, perform the various steps of the method in any order. The steps outlined herein are exemplary and can be implemented in any combination thereof, including combinations that exclude, add, or modify certain steps.

FIG. 6 illustrates a first exemplary method embodiment. In this embodiment, the system 100 first determines the passive suppression, attenuation (602), or loss, of a transmitted signal when that signal is received as self-interference by the transmitting device. This determination of passive suppression can occur using estimates from pilot signals, calculations based on previously transmitted signals, a calculation based on the antenna positions and/or frequency, or any other effective method for approximating the amount of passive attenuation which will occur prior to receiving the self-interference. After determining the passive suppression of the interference signal (602), the system 100 generates a negative estimate of the interfering signal (604). In one embodiment, the system can utilize a known power level of a transmitted signal, subtract the amount of passive suppression to yield an estimated level of self-interference, and generate a negative version of that estimate signal. The negative estimate is then added to the interference signal (606) prior to converting the received signal from analog to digital. At this point, some residual self-interference signal can still be present in the received signal, and the system 100 applies digital cancellation (608) to remove as much of the residual self-interference signal as possible. Digital cancellation methods can vary, and in some instances can depend on the Signal-to-Interference Ratio (SIR) required. For example, if, due to passive suppression and active analog cancellation, it is determined that the SIR is already near a preferred value, the system 100 can opt for a form of digital cancellation requiring relatively less computing resources than when the SIR is not near the desired value.

FIG. 7 illustrates a second exemplary embodiment. The system 100 in this embodiment receives, at a receiving antenna, a signal transmitted by a transmitting antenna, the receiving antenna and the transmitting antenna comprising two unique antennas on a single device, to yield a self-interference signal (702). In other configurations, the system 100 can have multiple transmitting antennas, multiple receiving antennas, or both multiple transmitting antennas and multiple receiving antennas. The multiple transmitting antennas can be transmitting identical data sets, or unique data sets, from each antenna. Additionally, the multiple receiving antenna embodiments can be configured to receive identical data or unique data in each receiving antenna. The locations of the receiving antenna and the transmitting antenna can be determined based on increasing the passive suppression of the transmitted signals. The system then estimates the passive suppression of the self-interference signal (704). This estimate can be based on the specific frequencies of the transmitted signals, the antenna directionality, the orthogonality of the antennas with respect to one another, and distances between the antennas. Should the self-interference vary based on specific subcarrier or frequency, the estimate can vary accordingly based on the subcarrier or frequency. In addition, specific properties of the transmitting medium, and the physical properties of the system 100 can affect the passive suppression estimated. The estimate can be determined using signals communicated through a hard wire communication, or signals communicated using an electromagnetic transmission from an antenna. The system 100 then generates an analog cancellation signal based at least in part on the passive suppression estimated (706) and applies the analog cancellation signal to the self-interference signal, yielding a residual self-interference signal (708). If variable self-interference is detected between subcarriers or frequencies, the analog cancellation signal will be generated to reflect those variations, matching self-interference with frequency or carrier-specific analog cancellation signals. The system 100 then applies digital cancellation to the residual self-interference signal (710). The amount of digital cancellation can depend on the amount of processing power available, the needed Signal-to-Interference Ratio, the amount of processing being used to estimate the cancellation signal, and access to additional memory resources.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Additional features and advantages of the disclosure as set forth above, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The various embodiments described above are provided by way of illustration only and should not be construed to limit the scope of the disclosure. For example, the principles herein apply equally to devices and systems where a single device is full-duplex capable as to devices and systems where multiple communicating devices are full-duplex capable. Those skilled in the art will readily recognize various modifications and changes that may be made to the principles described herein without following the example embodiments and applications illustrated and described herein, and without departing from the spirit and scope of the disclosure.

We claim:

1. A method comprising:
   determining a passive suppression of an interference signal, based on a previously estimated passive suppression stored in a database;
   generating a residual interference signal based on a combination of the interference signal and the passive suppression of the interference signal; and
   applying digital cancellation to the residual interference signal based on the passive suppression.

2. The method of claim 1, wherein the interference signal is received at a receiving antenna which is distinct from a transmitting antenna on a single device.

3. The method of claim 2, wherein the transmitting antenna comprises a plurality of transmitting antennas.

4. The method of claim 2, wherein the receiving antenna comprises a plurality of receiving antennas.

5. The method of claim 1, wherein the combination is based on one of adding and subtracting the passive suppression to the interference signal.

6. The method of claim 1, wherein the passive suppression is based on a subcarrier interference in the self-interference signal.

7. The method of claim 6, wherein the subcarrier interference indicates a variable self-interference between subcarriers.

8. A system comprising:
   a processor; and
   a computer-readable storage medium having instructions stored which, when executed by the processor, cause the processor to perform operations comprising:
   determining a passive suppression of an interference signal, based on a previously estimated passive suppression stored in a database;
   generating a residual interference signal based on a combination of the interference signal and the passive suppression of the interference signal; and
   applying digital cancellation to the residual interference signal based on the passive suppression.

9. The system of claim 8, wherein the interference signal is received at a receiving antenna which is distinct from a transmitting antenna on a single device.

10. The system of claim 9, wherein the transmitting antenna comprises a plurality of transmitting antennas.

11. The system of claim 9, wherein the receiving antenna comprises a plurality of receiving antennas.

12. The system of claim 8, wherein the combination is based on one of adding and subtracting the passive suppression to the interference signal.

13. The system of claim 8, wherein the passive suppression is based on a subcarrier interference in the self-interference signal.

14. The system of claim 13, wherein the subcarrier interference indicates a variable self-interference between subcarriers.

15. A computer-readable storage device having instructions stored which, when executed by a computing device, cause the computing device to perform operations comprising:
   determining a passive suppression of an interference signal, based on a previously estimated passive suppression stored in a database;
   generating a residual interference signal based on a combination of the interference signal and the passive suppression of the interference signal; and
   applying digital cancellation to the residual interference signal based on the passive suppression.

16. The computer-readable storage device of claim 15, wherein the interference signal is received at a receiving antenna which is distinct from a transmitting antenna on a single device.

17. The computer-readable storage device of claim 16, wherein the transmitting antenna comprises a plurality of transmitting antennas.

18. The computer-readable storage device of claim 16, wherein the receiving antenna comprises a plurality of receiving antennas.

19. The computer-readable storage device of claim 15, wherein the combination is based on one of adding and subtracting the passive suppression to the interference signal.

20. The computer-readable storage device of claim 15, wherein the passive suppression is based on a subcarrier interference in the self-interference signal.

* * * * *